June 28, 1966     A. U. BRYANT     3,258,243
VACUUM VALVE HAVING A GATE MEMBER RECEIVED
IN RETRACTABLE GUIDEWAYS
Filed April 2, 1963     6 Sheets-Sheet 1
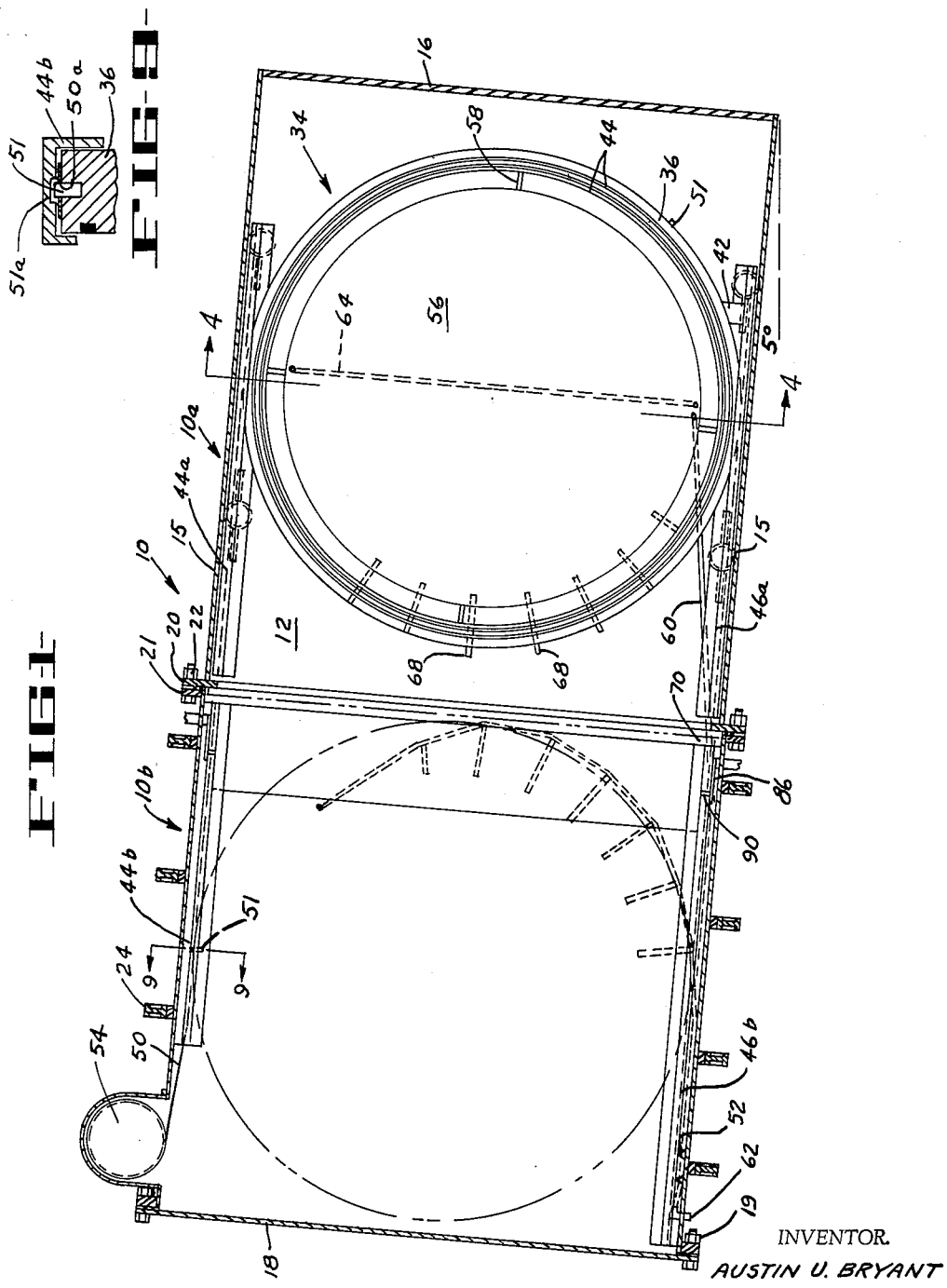
INVENTOR.
AUSTIN U. BRYANT
BY
ATTORNEY

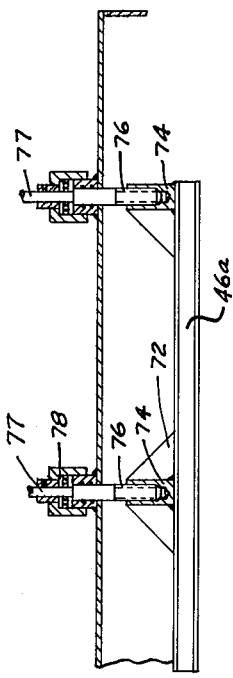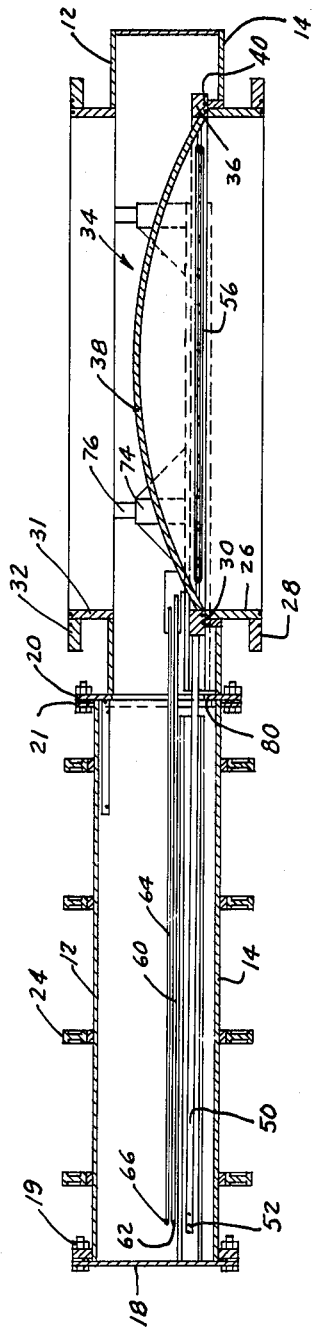

June 28, 1966 A. U. BRYANT 3,258,243
VACUUM VALVE HAVING A GATE MEMBER RECEIVED
IN RETRACTABLE GUIDEWAYS
Filed April 2, 1963 6 Sheets-Sheet 3
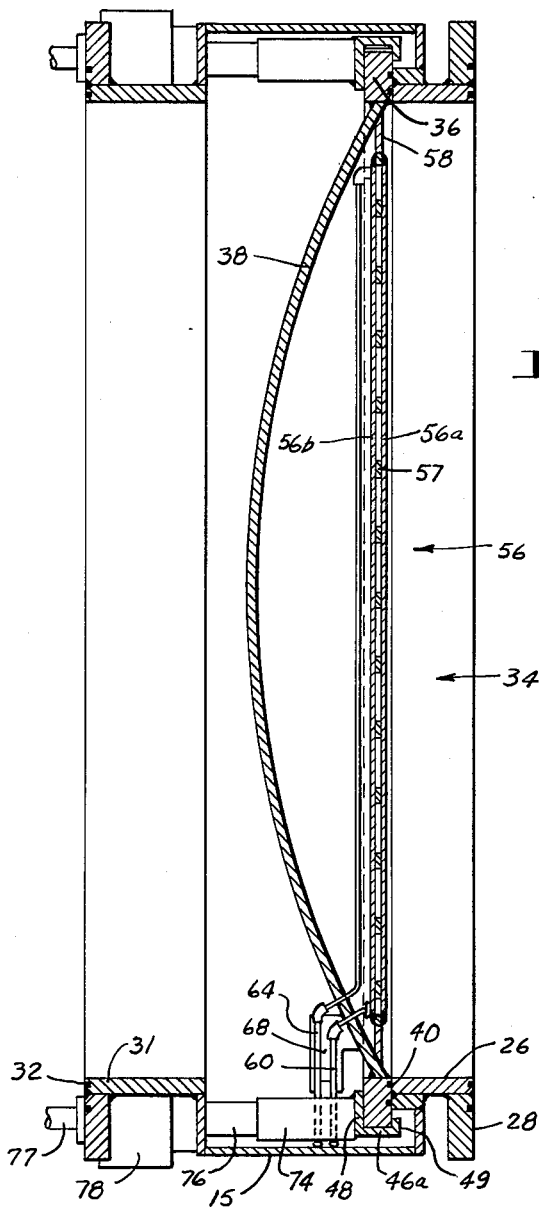
FIG-4-
INVENTOR.
AUSTIN U. BRYANT
BY Edward B Gregg
ATTORNEY

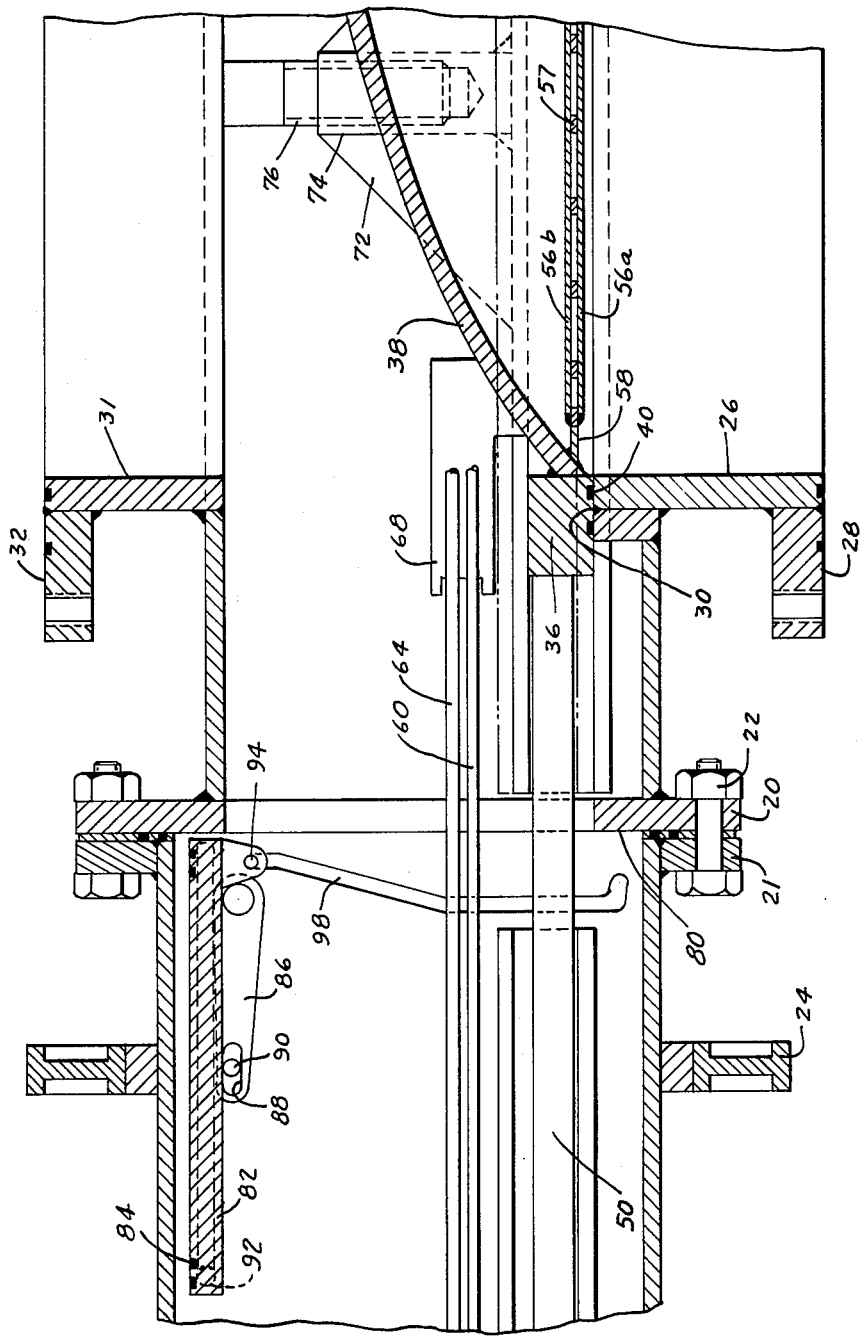

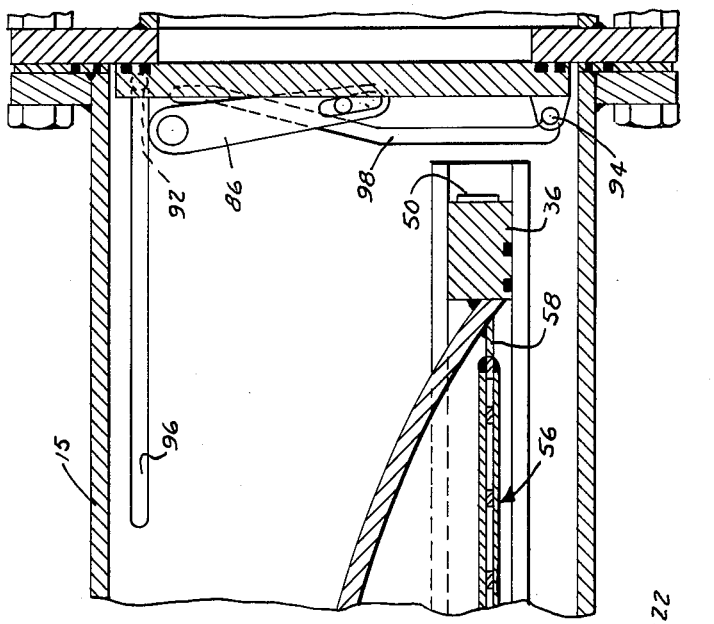
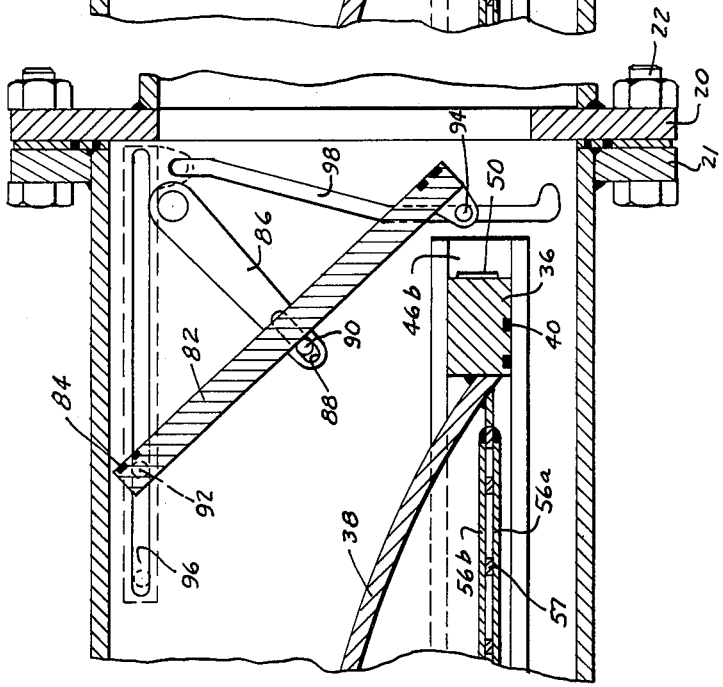

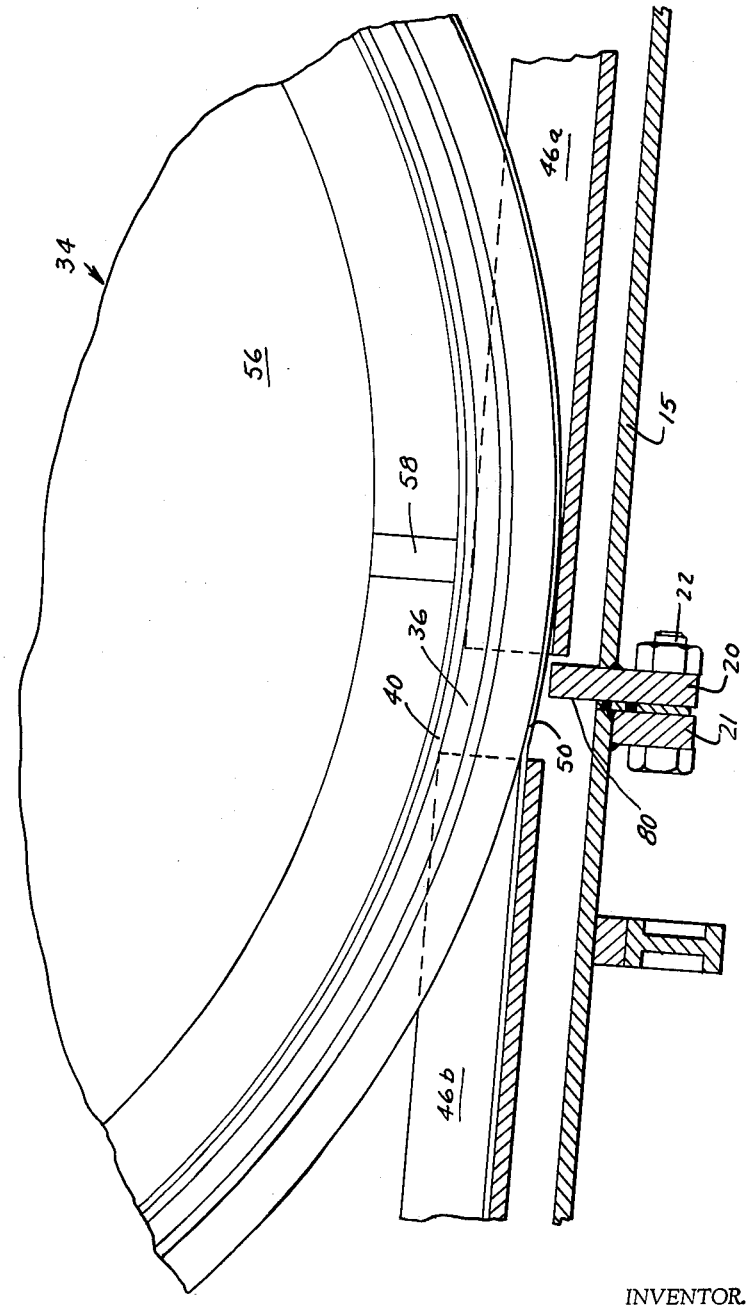

United States Patent Office 3,258,243
Patented June 28, 1966

3,258,243
VACUUM VALVE HAVING A GATE MEMBER RECEIVED IN RETRACTABLE GUIDEWAYS
Austin U. Bryant, Walnut Creek, Calif., assignor to Grove Valve and Regulator Company, Oakland, Calif., a corporation of California
Filed Apr. 2, 1963, Ser. No. 270,071
22 Claims. (Cl. 251—158)

This invention relates to a vacuum valve and, more particularly, to a vacuum valve that is suitable for manufacture in large sizes to serve as an access door between an access chamber and a main vacuum chamber for entry and egress of personnel and equipment.

In connection with any large vacuum chambers, it is frequently desirable to have an access opening through which entry may be gained particularly for the purpose of placing equipment and articles that are being subjected to the vacuum. Such entry is usually through a preliminary vacuum access chamber that may be closed and evacuated to prevent loss of vacuum in the main chamber during entry. However, such access openings must be provided with a closure member capable of effecting a tight seal around the opening, particularly when such access chamber is opened to the atmosphere. This suggests the use of a valve, such as a gate valve, but the operation of the valve under a high degree of vacuum precludes the use of lubricants for the valve seals. Consequently, valves which close by rubbing against the seat, e.g., gate valves, butterfly valves, globe valves and like, suffer the disadvantage of incurring considerable damage from abrasion in normal operation. Moreover, when it is desired to provide a valve closure for an access opening of any appreciable size as where the access opening is for personnel and equipment, the size and weight of the valve closure member is such that costly and heavy valve actuating mechanisms are usually required in order to operate it.

It is, therefore, an object of this invention to provide a vacuum valve that may be closed in tightly sealed position without abrasive action on the seals.

It is a further object of this invention to provide a gate valve of extreme size that may be operated by means of a relatively small actuating mechanism.

It is a further object of this invention to provide a gate valve including a gate the operation of which is aided by force of gravity.

It is a further object of this invention to provide means for isolating surfaces of the gate and valve housing from those within the housing subjected to vacuum, and to permit removal of the gate without loss of vacuum.

It is a further object of this invention to provide a gate valve including means for isolating the body space containing the gate when the gate is in its open position.

In carrying out this invention, I provide a valve housing including a generally upright wall having a flow passageway therethrough which may range anywhere from less than three to more than twenty feet in diameter in order to provide access to a vacuum chamber. The valve closure member comprises a circular gate the opposite marginal portions of which are received in channel guide members disposed along the upright wall so that the gate may move along the guide members between open and closed positions. In the preferred embodiment, the guideways are disposed at a slight angle to the horizontal so that the lower guideway forms a sort of ramp along which the gate may be moved in one direction simply by rolling under force of gravity. Then, for opening the gate, I provide a ribbon or tape of stainless steel or the like which is attached at one end to one of the guideways, extended in a loop around the leading arcuate edge of the gate and then back along the other guideway to a reel upon which it is selectively wound and unwound. Thus, the reel may be driven in one direction to pay out the ribbon and permit the gate to roll down the ramp-like guideways and along the surface of the ribbon until it is in closed position in alignment with the access opening, and the reel is driven in the other direction to shorten the loop and pull the gate with it, the gate rolling along the surface of the ribbon. When rubber seals are provided on the gate itself, the channel guideways are disposed so that the gate rolls along with the rubber seals free from contact with the channel guideways and, in any case, there is no sliding contact between the valve and valve seat around the access opening. Then, after the gate is in alignment with the access opening a mechanism is actuated to move the guide channels laterally, carrying the gate into sealing contact with the valve seat. Thus, the only forces on the seal resulting from gate movement are compressive forces and there is no abrasive, sliding action. When the gate is in its open position, the end of the valve body in which it is then situated may be sealed off from the remainder of the body in order to minimize the surfaces that are subjected to a vacuum and to permit removal of the gate for cleaning and repairing without interruption of the vacuum. For this purpose a second valve seat is provided around the inside of the housing and, in asssociation therewith, a complementary isolation valve gate is mounted in the housing on a linkage that permits the gate to be swung from closed position to open position along a side wall wherein it will not interfere with movement of the main circular gate. Moreover, the linkage is also arranged so that the final movements of the isolation gate pressing against its valve seat, and its initial increments of movement while separating from the valve seat are in directions transverse to the seat. Thus, there if no sliding action that would tend to cause abrasion. Particularly in the alternative form of this invention wherein the valve body is disposed generally vertically, the isolation gate performs an additional significant function as a safety barrier for the main valve gate. That is if the gate were permitted to drop as in the case of the steel tension ribbon breaking, the isolation door will stop the fall and prevent injury to personnel and damage to the valve.

Other objects and advantages of this invention will become apparent from the specification following when read in conjunction with the accompanying drawings wherein:

FIG. 1 is a vertical section view of a vacuum valve embodying features of this invention;

FIG. 2 is a horizontal section view of the valve shown in FIG. 1;

FIG. 3 is a partial section view showing track operating mechanism forming a part of this invention;

FIG. 4 is a vertical section view taken along line 4—4 of FIG. 1;

FIG. 5 is a partial section view in enlarged scale showing portions of the valve operating mechanism with the isolation gate in open position;

FIGS. 6 and 7 are enlarged horizontal section views showing the isolation door in closed and partially open positions, respectively;

FIG. 8 is an enlarged partial vertical section view showing the lower guide track where separated to accommodate the isolation door; and FIG. 9 is an enlarged partial section view taken along line 9—9 of FIG. 1 with a portion of the gate included.

Now referring to the drawings with greater particularity, the vacuum valve of this invention 10 comprises a pair of upright sidewalls 12, 14, interconnecting walls 15, an end wall 16 and an opposite end closure plate 18 which is secured to the valve body by bolts or the like 19 to permit removal for a purpose hereinafter to be described. Because the vacuum valves of this invention may be as large as twenty feet or more in width, from top to bottom in FIG. 1, the valve body is preferably formed in two sections 10a and 10b for ease of manufacture, handling and shipping, the sections having peripheral flanges 20 and 21 which are joined at installation by suitable bolts 22 or the like. Preferably the valve body sidewalls 12 and 14 are reinforced against buckling by structural ribs 24 encircling the body section 10b.

One sidewall 14 (FIG. 2) includes a flow passageway 26 that terminates at the outer end in a flange 28 or other suitable means for connection to a vacuum chamber (not shown) and at its inner end in a valve seat 30. The other upright wall 12 also has a flow passageway 31 terminating in a flange 32 that permits it to be connected to an intermediate chamber or the like. Thus, in one environment in which the vacuum valve of this invention 10 may be employed, personnel or equipment may move from atmospheric conditions into an intermediate access chamber while a valve gate 34 is sealed against the valve seat 30 in order to prevent loss of vacuum in the main vacuum chamber. Then, after the intermediate chamber is closed to the atmosphere and evacuated, the gate 34 may be moved to open position to permit entry directly into the main vacuum chamber.

Preferably the valve gate 34 is of circular configuration including an annular flange 36 across which is sealed a concave disc 38. Suitable seal means 40 which may be of the O-ring type are provided in the annular flange 36 to insure fluid-tight sealing on the gate. In the preferred embodiment of this invention marginal portions of the gate's annular flange 36 are received in upper and lower guide channels 44a, 44b and 46a, 46b and the housing 10 is mounted at a slight angle in the order of five degrees, to the horizontal. Thus, the lower guide channel sections 46a, 46b form a sort of ramp along which the circular valve gate 34 will roll from left to right in FIG. 1 to a position in alignment with the flow passage as determined by the stop 42. As the gate moves along the incline its path of movement is constrained by engagement of the guide channels that receive its marginal edges. It will be noted particularly in FIG. 4 that each of the guide channels includes a relatively wide back leg but a relatively narrow front leg 49 so that any friction between the front leg and the circular valve gate flange will be confined to the peripheral portions outside the O-ring seals 40. In the preferred embodiment of FIG. 1, the circular valve gate is supported on and rolls along the ramp-like bottom track and is merely restrained against wobbling by the upper track. It is to be understood that the housing itself 10 may be disposed horizontal with just the guide tracks inclined.

The means for moving the valve uphill to its open position comprises a tension member 50 preferably formed of a flat metallic ribbon that is secured at 52 to the lower track and extends in a loop around the forward arcuate edge of the valve gate 34 and then along the upper track 44a, 44b to a drum or reel 54 upon which it may be wound or unwound by suitable drive means (not shown). Thus, when the reel 54 is rotated in a clockwise direction in FIG. 1, the loop of the metallic ribbon 50 is shortened and the valve gate 34 is pulled toward the left to roll along the inclined guide track 46a, 46b, and in rolling contact with the ribbon to its open position shown in phantom in FIG. 1. Similarly, when the reel 54 is rotated in a counterclockwise direction the loop of the metallic ribbon 50 is extended and the circular gate is permitted to roll along the track until it reaches the position shown in full lines in FIG. 1 in engagement with the stop 42 and in alignment with the flow passageway.

If desired, the valve gate may be provided with a cryogenic panel 56 secured by suitable brackets 58 in a spider arrangement to the annular gate flange 36, the brackets 58 providing only limited contact between the panel 56 and the annular flange 36 in order to minimize heat conductivity. Where a hollow cryogenic panel is provided, hose lines 60 of flexible metal or the like are provided to bring cryogenic fluids, such as liquid nitrogen, from a suitable source (not shown) into the housing at the fitting 62 and then to and through the double-walled cryogenic panel and out the outlet hose 64 (FIGS. 2 and 4) back to the housing outlet 66. The cryogenic panel 56 may comprise a pair of flat circular discs 56a and 56b secured together with spacers 57 therebetween to form a hollow panel which permits free flow of fluid therethrough.

In order to avoid entanglement of the flexible hoses 60 and 64 as the gate 34 rolls between its open and closed positions, I provide a series of brackets 68 which are secured to the back of the concave disc 38 of the valve gate to function as reel elements upon which the flexible hoses are wound when the gate is retracted and from which they are unwound as the gate rolls into its closed position. Preferably, the brackets 68 are of gradually increasing radial displacement as shown in FIG. 1 in order to minimize the bending to which the flexible metal hoses are subjected as they are reeled up.

Particularly when the cryogenic panel is provided with the attendant flexible hoses, it is desirable to insure proper and restricted circumferential disposition of the gate in each position in order to avoid distortion of the hoses 60 and 64. For this purpose there is provided some positive means of engagement between the tape 50 and the surface of the gate rim 36. As shown in FIGS. 1 and 9, this may take the form of one or more pins 51 in the gate rim engageable in complementary holes 50a in the tape 50. Of course, the arrangement could be reversed with the pins in the tape 50 but where they are placed in the gate rim it may be necessary to provide a slot 51a in one or both of the tracks, such as 44b in order to accommodate the pin 51 should it roll to a position at the top of the gate as shown at the left in FIG. 1.

Each guide channel 44a, 44b and 46a, 46b is divided into two sections separated by a gap 70 for a purpose hereinafter to be described and, as shown most clearly in FIGS. 2, 3 and 5, a pair of brackets 72 secured to each of the channels carries an internally threaded hub 74 each to receive a screw member 76 on a shaft 77 rotatably mounted in a bearing carried on the outside of the opposite upright wall 12. Consequently, when the shafts 77 are rotated the threaded members thereon 76 will produce linear movement of the threaded hubs 74 which, in turn, carry the guide tracks 44a and 46a and the valve gate 34 contained thereby transversely of the valve body 10 until the sealed annular flange 36 is pressed against the valve seat 30. Any suitable means, such as a drive chain or the like, may be provided to rotate all of the threaded shafts 77 in unison and by equal amounts in order to insure uniform sealing pressure with the valve gate in the position shown in FIGS. 2 and 4.

Summarizing the operation of the valve with respect to the embodiment of FIG. 1, the circular gate 34 may be moved from its open position shown in phantom at the left in FIG. 1 by rotating the tape-winding reel 54 in a counterclockwise direction to extend the loop of the metallic tape tension member 50, permitting the circular gate to roll along the bottom track 46b, 46a with its upper edge being restrained by the upper channel 44b, 44a until the valve gate reaches the stop 42 at which time it is in the position shown in full lines in FIG. 1 wherein it is in alignment with the flow passageway 26. Then, the four screw members 76 are rotated simultaneously to move the upper and lower tracks transverse to the valve body, and the tracks carry the valve gate 34 with them into sealing engagement on the valve seat 30. Similarly, to open the valve the screw members are rotated in the opposite direction to withdraw the upper and lower tracks 44a and 46a and move the valve gate 34 away from the seat. Then, the tape-winding reel is rotated in a clockwise direction to shorten the loop of the metallic tape tension member which in turns rolls the gate back up the incline to the left in FIG. 1 as the flexible hoses 60 and 64 are wound onto the reel elements 68.

In the alternative, the valve body 10 may be installed in an upright position wherein the valve gate is suspended from the loop of metallic tape and is lowered into closed position while guided by the opposing channel tracks. However, even in this instance it is preferable to have the valve body inclined slightly from the vertical so that the gate will still roll along the tracks.

When the valve gate 34 is in its open position, it may be desirable to remove it for cleaning and repairs without interrupting the vacuum in the chamber to which the valve body 10 is connected. The valve gate 34 can be removed from the body 10 simply by removing the valve body end plate 18, but before the end plate can be removed, some means must be provided to seal off the interior of the valve housing against vacuum loss. Referring most particularly to FIGS. 5, 6 and 7 an internal shoulder 80 is provided around the valve body as, for example, at the coupling 20, 21 between the sections of the valve body. The shoulder 80, which may extend partially into the gap 70 between the channel guideway sections 44a, 44b and 46a 46b, functions as an isolation valve seat against which such sealing may be effected. In cooperation with this isolation valve seat 80, I provide a gate 82 of a configuration to conform to the seat. Thus, in the valve herein illustrated and described, the valve seat 80 is preferably of rectangular configuration extending around the upright and interconnecting walls 12, 14 and 15. Similarly, the isolation gate 82 is preferably of rectangular configuration and includes seal members 84 which may be of the O-ring type. Pivotally mounted at both the top and the bottom interconnecting walls 15 are levers 86 each of which has a slot 88 in the outer end slidably to receive a pin 90 carried on one end of the isolation gate 82. Additionally, a pair of pins 92 and 94 carried on the gate 82 are slidably received in longitudinal and transverse slots 96 and 98 carried in the valve body and configurated to constrain the valve gate to move with pivotal movement of the lever first, outward from the position shown in FIG. 6 away from the valve seat with no relative sliding movement between the seat 80 and the gate 82 that would tend to cause abrasive damage to the seals 84. Then, the gate swings across to the position shown in FIG. 5 wherein it is disposed along one upright wall of the valve body.

With the isolation gate 82 in its closed position as shown in FIG. 6, the valve body end plate 18 may be removed and the circular valve gate taken from the body for cleaning or repairs. Moreover, as an additional advantage, the isolation gate confines the vacuum to one end of the valve and, therefore, restricts the surface area of the valve that could become contaminated in the event that corrosive materials are present. Additionally, and particularly when the valve body is disposed vertically, the isolation gate provides a safety barrier that will prevent the circular valve gate from falling onto personnel or equipment situated in the access opening.

The gap 70 between the tracks 46a and 46b along which the circular gate 34 rolls must be arranged so as not to block the movement of the gate and, as shown in FIG. 8, the levels of the lower guide rail section 46a and 46b bear a particular relationship to each other. Specifically, when the annular flange 36 of the valve gate is tangent with the rearward end of the forward guide track 46a as shown, the forward end of the rear guide track section 46b is also in contact with the rolling edge of the gate or more particularly with the metallic tape 50 around the gate. Thus, the rear section is slightly higher than the front so that the gate rolls smoothly thereon. Similarly, when the gate is moving in the other direction and drops off the end of the rearward section it falls onto the forward section and, at no time, does the gate straddle the gap between sections with an arcuate portion thereof extending below the surface of section 46a.

While I have described this invention in connection with a preferred embodiment thereof, it is understood that modifications and changes therein may be made by those skilled in the art without departing from the spirit and scope of this invention as defined by the claims appended hereto.

Having described my invention, I claim:

1. A gate valve comprising:
   a valve body including an upright wall,
   a fluid flow opening in said upright wall,
   a valve seat surrounding said flow opening,
   a pair of guideways on opposite sides of said flow opening extending generally parallel to said upright wall,
   a valve gate having opposite marginal portions received in said guideways,
   said gate being moveable along said guideways between closed and open positions into and out of alignment with said valve seat, and
   means for moving said guideways laterally when said gate is in said closed position to move said gate against said seat.

2. The gate valve defined in claim 1 wherein:
   said gate is movable along said guideways in one direction by the force of gravity and including:
      a tension member engaging said gate, and
      selectively operated means for pulling said tension member to move said gate in the other direction.

3. The gate valve defined in claim 1 wherein said valve body comprises:
   an opposing upright wall and a pair of interconnecting walls to form an enclosure,
   an internal shoulder around said enclosure displaced laterally from said valve seat,
   a valve closure member within said enclosure, and
   means for mounting said valve closure member for movement between a first position against said shoulder and a second position adjacent one of said upright walls to clear said enclosure for movement of said valve gate.

4. The gate valve defined in claim 2 wherein said tension member comprises:
   an elongated ribbon-like member secured at one end to one of said guideways and arranged in a loop around the forward arcuate surface of said gate and back along the other of said guideways, and
   reel means to which the other end of said ribbon-like member is secured.

5. The gate valve defined in claim 4 including:
   complementary engageable means on said ribbon and said arcuate surface of said gate to prevent relative sliding therebetween.

6. A gate valve comprising:
   a valve body including an upright wall,
   a fluid flow opening in said upright wall adjacent one end thereof,
   a valve seat surrounding said flow opening,
   a pair of parallel guideways on opposite sides of said flow opening extending generally parallel to said upright wall,
   one end of each of said guideways being at a different elevation than the other end,
   a circular valve gate in said valve body with opposite marginal portions thereof being received in said guideways to roll therealong,
   said gate being movable along said guideways between closed and open positions into and out of alignment with said valve seat,
   tension means for pulling said gate toward the more elevated ends of said guideways, and
   means for moving said guideways laterally when said gate is in said closed position to move said gate against said seat.

7. The gate valve defined in claim 6 wherein said tension member comprises:
a flat, narrow elongated strip secured at one end to the more elevated end of one of said guideways and arranged in a loop extending along said one guideway and around the circular edge of said gate and back along the other of said guideways, and
a reel to which the other end of said strip is attached.

8. The gate valve defined in claim 7 including:
complementary engageable means on said strip and said circular edge of said gate to prevent relative sliding therebetween.

9. The gate valve defined in claim 6 wherein said valve body comprises:
an opposing upright wall and a pair of interconnecting walls to form an enclosure,
an internal shoulder around said enclosure displaced laterally from said valve seat,
a valve closure member within said enclosure, and
means for mounting said valve closure member for movement between a first position against said shoulder and a second position adjacent one of said upright walls to clear said enclosure for movement of said valve gate.

10. The gate valve defined in claim 9 wherein said valve closure mounting means comprises:
a link pivoted on said valve body adjacent one of said upright walls to swing in a plane parallel to said interconnecting walls and at the other end to the back of said valve closure,
a pair of tracks parallel to said plane, and
laterally spaced guide members on said valve closure each moveable along one of said tracks,
one of the tracks extending along said one upright wall and the other of said tracks extending between said upright walls so that when said link pivots one guide member on said valve closure moves across said enclosure and the other guide member moves along said one upright wall.

11. The gate valve defined in claim 9 including:
a cover plate on said valve body removable when said valve closure member is in said first position to provide access to said enclosure and said valve gate.

12. A gate valve comprising:
a valve body including an upright wall,
a fluid flow opening in said upright wall adjacent one end thereof,
a valve seat surrounding said flow opening,
a parallel pair of channel guideways on opposite sides of said flow opening,
one end of each of said guideways being higher than the othe end,
a circular valve gate in said valve body with opposite marginal portions thereof being received in said guideways to roll therealong,
a tension member for pulling said gate toward the more elevated ends of said channel guideways,
said gate being conditioned to roll along said guideways under force of gravity in one direction and under force of said tension member in the other direction between closed and open positions into and out of alignment with said valve seat, and
means for moving said guideways laterally when said gate is in said closed position to move said gate against said seat.

13. The gate valve defined in claim 12 wherein said valve body comprises a second upright wall generally parallel to said first wall and a pair of interconnecting walls to form an enclosure and including:
an internal shoulder extending around said enclosure,
a closure member, and
mounting means for moving said closure member between a colsed position against said shoulder and an open position adjacent one of said upright walls.

14. The gate valve defined in claim 13 wherein said mounting means comprises:
a lever pivoted at one end of said valve body adjacent said one upright wall to swing parallel to said interconnecting walls and at the other end to the back of said closure member, and
cooperating track and guide means on said closure member and valve body for moving said closure member from said closed position first in a direction transversely away from said shoulder and then to swing adjacent said one upright wall.

15. The gate valve defined in claim 12 wherein said valve gate comprises an annular rim engaged in said channel guideways, and
a concave disc sealed around the preiphery thereof to said rim.

16. The gate valve defined in claim 12 including a hollow panel carried on said gate,
hose members connected between the outside of said valve body and said panel for conducting fluid to and from the space between said panel, and
reel means on the back of said gate for winding and unwinding said hose member as the valve gate rolls along said channel guideways.

17. A gate valve comprising:
a valve body including an opposing pair of upright walls and interconnecting walls,
a fluid flow opening in one of said upright walls adjacent one end thereof,
a valve seat surrounding said flow opening,
a pair of parallel channel guideways on vertically opposite sides of said fluid flow opening extending from said opening toward the other end of said one upright wall at a slight upward slope,
a circular valve gate in said valve body with upper and lower marginal portions thereof received in said guideways,
said gate being moveable along said guideways into and out of alignment with said valve seat,
said guideways being normally displaced laterally from said valve seat,
means for moving said gate axially when in alignment with said valve seat into and out of engagement therewith,
an elongated tension member secured at one end to said valve body to extend along one of said guideways toward said opening and then in a loop around said circular gate and back along the other of said guideways, and
a reel member to which the other end of said tension member is secured.

18. The gate valve defined in claim 17 including:
valve means for sealing off said body across the space between said pairs of guideway sections.

19. A gate valve comprising:
a valve body including opposing pairs of end walls and interconnecting walls,
a fluid flow opening in one of said end walls,
a valve seat surrounding said flow opening,
a valve gate moveable in said valve body between a closed position in alignment with said valve seat and an open position displaced therefrom,
a body space in said valve body to accommodate said valve gate when in said open position, and
valve means for sealing off said body space when said valve gate is in said open position,
said valve means comprising:
an internal flange around said end and interconnecting walls between said body space and said valve seat,
a valve closure,
a link pivoted on said valve body to swing in a plane generally parallel to one of said pairs of walls, the free end of said link being pivotally connected to said valve closure, and complementary engaging means on said valve body and said valve closure for guiding said valve closure upon pivotal movement of said link to swing from an open position adjacent one of said end walls to a second position generally parallel to said internal flange and then to move transversely into engagement with said flange, and return.

20. A gate valve comprising:
a valve body including an opposing pair of upright walls and interconnecting walls,
a fluid flow opening in one of said upright walls adjacent one end thereof,
a valve seat surrounding said flow opening,
a pair of parallel channel guideways on vertically opposite sides of said fluid flow opening extending from said opening toward the other end of said one upright wall at a slight upward slope,
a circular valve gate in said valve body with upper and lower marginal portions thereof received in said guideways,
said gate being moveable along said guideways into and out of alignment with said valve seat,
said guideways being normally displaced laterally from said valve seat,
means for moving said guideways laterally when said gate is aligned with said seat to move said gate against said seat,
an elongated tension member secured at one end to said valve body to extend along one of said guideways toward said opening and then in a loop around said circular gate and back along the other of said guideways, and
a reel member to which the other end of said tension member is secured.

21. A gate valve comprising:
a valve body including an opposing pair of upright walls and interconnecting walls,
a fluid flow opening in one of said upright walls adjacent one end thereof,
a valve seat surrounding said flow opening,
a pair of parallel channel guideways on vertically opposite sides of said fluid flow opening extending from said opening toward the other end of said one upright wall at a slight upward slope,
a circular valve gate in said valve body with upper and lower marginal portions thereof received in said guideways,
said gate being moveable along said guideways between closed and open positions into and out of alignment with said valve seat,
each of said guideways being formed in two longitudinally aligned sections with one pair of sections at said one end of the valve body normally displaced laterally from said valve seat,
an elongated tension member secured at one end to said valve body to extend along one of said guideways and then in a loop around said circular gate and back along the other of said guideways, and
a reel member to which the other end of said tension member is secured.

22. A gate valve comprising:
a valve body including opposing pairs of end walls and interconnecting walls,
a fluid flow opening in one of said end walls,
a valve seat surrounding said flow opening,
a valve gate moveable in said valve body between a closed position in alignment with said valve seat and an open position displaced therefrom,
a body space in said valve body to accommodate said valve gate when in said open position, and
valve means for sealing off said body space when said valve gate is in said open position,
said valve means comprising:
an internal flange around said end and interconnecting walls between said body space and said valve seat,
a valve closure,
a link pivoted on said valve body to swing in a plane generally parallel to one of said pairs of walls,
the free end of said link being pivotally connected to said valve closure,
a pair of tracks in said valve body parallel to said plane, and
laterally spaced guide members on said valve closure each moveable along one of said tracks,
one of said tracks extending along one of the other of said pairs of walls away from said internal flange and the other of said tracks extending across said valve body adjacent said internal flange between said other pair of walls.

References Cited by the Examiner
UNITED STATES PATENTS

| | | | |
|---|---|---|---|
| 1,475,731 | 11/1923 | Windett | 251—158 |
| 1,965,826 | 7/1934 | Daniel | 251—193 X |
| 1,998,081 | 4/1935 | Gerlick | 251—294 X |
| 2,612,338 | 9/1952 | Flosdorf | 251—158 |
| 2,808,849 | 10/1957 | Pottmeyer | 251—294 X |
| 2,884,959 | 5/1959 | Neely | 251—187 X |
| 2,973,180 | 2/1961 | Morgan | 251—187 X |
| 3,170,668 | 2/1965 | Auliso | 251—193 X |

FOREIGN PATENTS 1,248,964   11/1960   France.

ISADOR WEIL, *Primary Examiner.*
CLARENCE R. GORDON, *Examiner.*